United States Patent
Smith (12)

(10) Patent No.: US 6,314,488 B1
(45) Date of Patent: Nov. 6, 2001

(54) SYSTEM FOR SEGMENTING A FIBRE CHANNEL ARBITRATED LOOP TO A PLURALITY OF LOGICAL SUB-LOOPS USING SEGMENTATION ROUTER AS A MASTER TO CAUSE THE SEGMENTATION OF PHYSICAL ADDRESSES

(75) Inventor: Brian R. Smith, Round Rock, TX (US)

(73) Assignee: Crossroads Systems, Inc., TX (US)

( * ) Notice: Subject to any disclaimer, the term of this patent is extended or adjusted under 35 U.S.C. 154(b) by 0 days.

(21) Appl. No.: 09/076,244

(22) Filed: May 12, 1998

(51) Int. Cl.[7] .................................................. G06F 13/362
(52) U.S. Cl. .................... 710/240; 710/241; 710/131; 709/238; 709/249; 370/398; 370/462
(58) Field of Search ...................................... 710/240, 241, 710/243, 244, 40, 113, 131; 709/238, 244, 249, 251; 370/398, 399, 452, 453, 457, 461, 462

(56) References Cited

U.S. PATENT DOCUMENTS

| | | | | |
|---|---|---|---|---|
| 5,751,715 | * | 5/1998 | Chan et al. | 370/455 |
| 5,768,551 | * | 6/1998 | Bleiweiss et al. | 710/131 |
| 6,055,228 | * | 4/2000 | DeKoning et al. | 370/258 |
| 6,118,776 | * | 9/2000 | Berman | 370/351 |

OTHER PUBLICATIONS

InterOperability Lab—Fibre Channel Tutorials and Resources [online], May 4, 1998 [retrieved on Oct. 31, 2000]. Retrieved from the Internet:<URL: http://www.iol-.unh.edu/training/fc/fc_tutorial.html>.*

* cited by examiner

Primary Examiner—Thomas Lee
Assistant Examiner—Thuan Du
(74) Attorney, Agent, or Firm—Gra Car Ware and Freidenrich

(57) ABSTRACT

A segmented fiber channel communications system includes a segmentation router, including a plurality of ports. Control instructions associated with the segmentation router establish the segmentation router as a master router by initializing each of at least a predetermined subset of the plurality of ports on a fiber channel arbitrated loop associated with the segmentation router. This causes the segmentation router to win the LISM process performed by the fiber channel arbitrated loop. Control instructions further includes instructions for transmitting LIPA, LIHA, and LISA frames to the fiber channel arbitrated loop from each of the ports. Transmission begins with LIPA frames having all but the LIPA frame range of address bits set to 1. This prevents other network loop ports attached to a router other than the master router from acquiring a duplicate address. The system then establishes a plurality of sub-loops each associated with a predetermined set of physical addresses.

20 Claims, 2 Drawing Sheets

SYSTEM FOR SEGMENTING A FIBRE CHANNEL ARBITRATED LOOP TO A PLURALITY OF LOGICAL SUB-LOOPS USING SEGMENTATION ROUTER AS A MASTER TO CAUSE THE SEGMENTATION OF PHYSICAL ADDRESSES

TECHNICAL FIELD OF THE INVENTION

The present invention relates to fibre channel communication systems and, more particularly, to a method and system for segmenting a fibre channel arbitrated loop that achieves improved performance and manageability over prior art methods and systems.

BACKGROUND OF THE INVENTION

In recent years several technical developments have converged to a bigger than ever need for extremely fast data links. High performance computers have become the focus of much attention in the data communications industry. Performance improvements have spawned increasingly data-intensive and high-speed networking applications, such as multimedia and scientific visualization. However, the existing network interconnects between computers and I/O devices are unable to run at the speeds needed.

One approach to provide fast data links, called fibre channel, provides a practical, inexpensive, yet expandable means of quickly transferring data between workstations, mainframes, supercomputers, desktop computers, storage devices, displays and other peripherals. Fibre channel is the general name of an integrated set of standards being developed by the American National Standards Institute (ANSI). Fibre channel attempts to combine the best of channel and network methods of communication into a new I/O interface that meets the needs of both channel users and network users.

Fibre channel allows for an active intelligent interconnection scheme, called a fabric, to connect devices. In a fibre channel system a port simply manages a simple point-to-point connection between itself and the fabric. Since a fibre channel system relies on ports logging in with each other and the fabric, it is irrelevant whether the fabric is a circuit switch, an active hub or a loop. The topology can be selected depending on system performance requirements or packaging options. Possible fibre channel topologies include point-to-point, crosspoint switched or arbitrated loop.

In a fibre channel arbitrated loop, a shared media exists amongst participating end stations and storage devices, for example. In the fibre channel arbitrated loop, a switched media device enables multiple end stations to have simultaneous conversations. To date however, no fibre channel arbitrated loop provides multiple conversations in the arbitrated loops. In these loops with the shared media device, only one pair may have a conversation at a given time.

Existing fibre channel arbitrated loop technologies have limited bandwidth because the bandwidths are shared among all of the participants in the loop. This limits the conversations to only one conversation at a time. As a result, latency occurs within the fibre channel arbitrated loop, which latency can be detrimental to various applications.

A problem associated with latency can be seen in the example of a database application. For example, if a database application is to scale, in the sense that there are more processors in the loop to achieve performance, there is a latency of somewhere in the vicinity of 10–100 microseconds. In a fibre channel arbitrated loop, if one frame time is 20 microseconds, there may be the need to wait for five frames in front of a given frame in order to conduct a conversation. If this occurs, latency extending beyond the 100 microseconds rule occurs, which violates the database application latency limit.

During arbitrated in a fibre channel arbitrated loop, when one individual arbitrates and wins a loop, it sends data to another end station. As long as an end station sends data, it owns the arbitrated loop and no other end station may use the loop. Depending on the amount of data being sent and its data flow rate, the sending station could continuously consume loop resources. This would prevent other end stations from using the loop until the transmission from the end station consuming loop resources was completed. This idea of "fairness" has both to do with how long an end station uses the loop and how frequently the user has access to the loop.

With existing fibre channel arbitrated loop technology, up to 126 devices may be used. This, in most cases, does not occur. Instead most systems use on the order of eight to ten devices. There is no system, however, that practically provides the ability to have multiples of eight to ten devices within an arbitrated loop. Nor is there a device that permits the aggregation of arbitrated loop stations or stations. With the current technology, arbitrated operates only within one loop.

SUMMARY OF THE INVENTION

In light of the above, a need exists for a method and system for segmenting a fibre channel arbitrated loop communications network that eliminates or substantially reduces latency and unfairness, as well as provides increased performance and overall flexibility relative to prior art fibre channel arbitrated loop operational methods and systems.

According to one aspect of the present invention, there is provided a segmented storage and communication system for a fibre channel communications system that includes a segmentation router comprising a plurality of ports. Control instructions associate with the segmentation router to establish the segmentation router as a master router. This occurs by initializing each of at least a predetermined subset of the plurality of ports on the fibre channel arbitrated loop that are part of the segmentation router. This causes the segmentation router to win the LISM process performed by the fibre channel arbitrated loop. The control instructions further include instructions for transmitting loop initialization frames to the fibre channel arbitrated loop from each of the ports, beginning with LIPA frames. In the LIPA frames, all but the LIPA frame range of address bits are set to 1. This prevents other network loop ports attached to a router other than the master router from acquiring a duplicate address. This establishes a plurality of sub-loops each associated with a predetermined set of physical addresses.

A technical advantage that the present invention provides is the ability to segment a given fibre channel arbitrated loop into a number of separate loops. This permits users on end stations at separate segments to have conversations within a local segment and receive, for example, the benefit of 100 megabytes per second data flow, i.e., full band width operation in the fibre channel at the different segmented loops. Thus, as long as a given segment is not crossed it is possible, using the present invention, to provide multiplicative bandwidth within a single channel fibre channel arbitrated loop. This overcomes the latency problem that exists in current fibre channel arbitrated loop technology.

Another technical advantage that the present invention provides is the ability to segment the fibre channel arbitrated loop so that multiple conversations may occur simultaneously. This allows end stations that otherwise would not have access to the loop to have access to their defined subsegment. Thus, even in the instance of an unfair station consuming a disproportionate amount of time in the fibre channel arbitrated loop, other stations may communicate using the segmented loop.

The present invention also provides the technical advantage of permitting a topology that supports a wide array of infrastructure components making the segmentation transparent to the user while at the same time increasing the fairness and reducing latency among devices.

The present invention provides the technical advantage of a much less expensive solution than using a switchboard for multiple simultaneous conversations. Moreover, the installed base of infrastructure components in an arbitrated loop cannot readily employ switchboards or other switches. Segmenting the fibre channel arbitrated loop according to the teachings of the present invention provides a topology supporting all the infrastructure components that is completely transparent to the user.

BRIEF DESCRIPTION OF THE DRAWINGS

For a more complete understanding of the present invention and the advantages thereof, reference is now made to the following description which is to be taken in conjunction with the accompanying drawings in which like reference numerals indicate like features and wherein.

DETAILED DESCRIPTION OF THE INVENTION

Preferred embodiments of the present invention are illustrated in the FIGUREs. like numerals being used to refer to like and corresponding parts of the various drawings.

Figure 1:
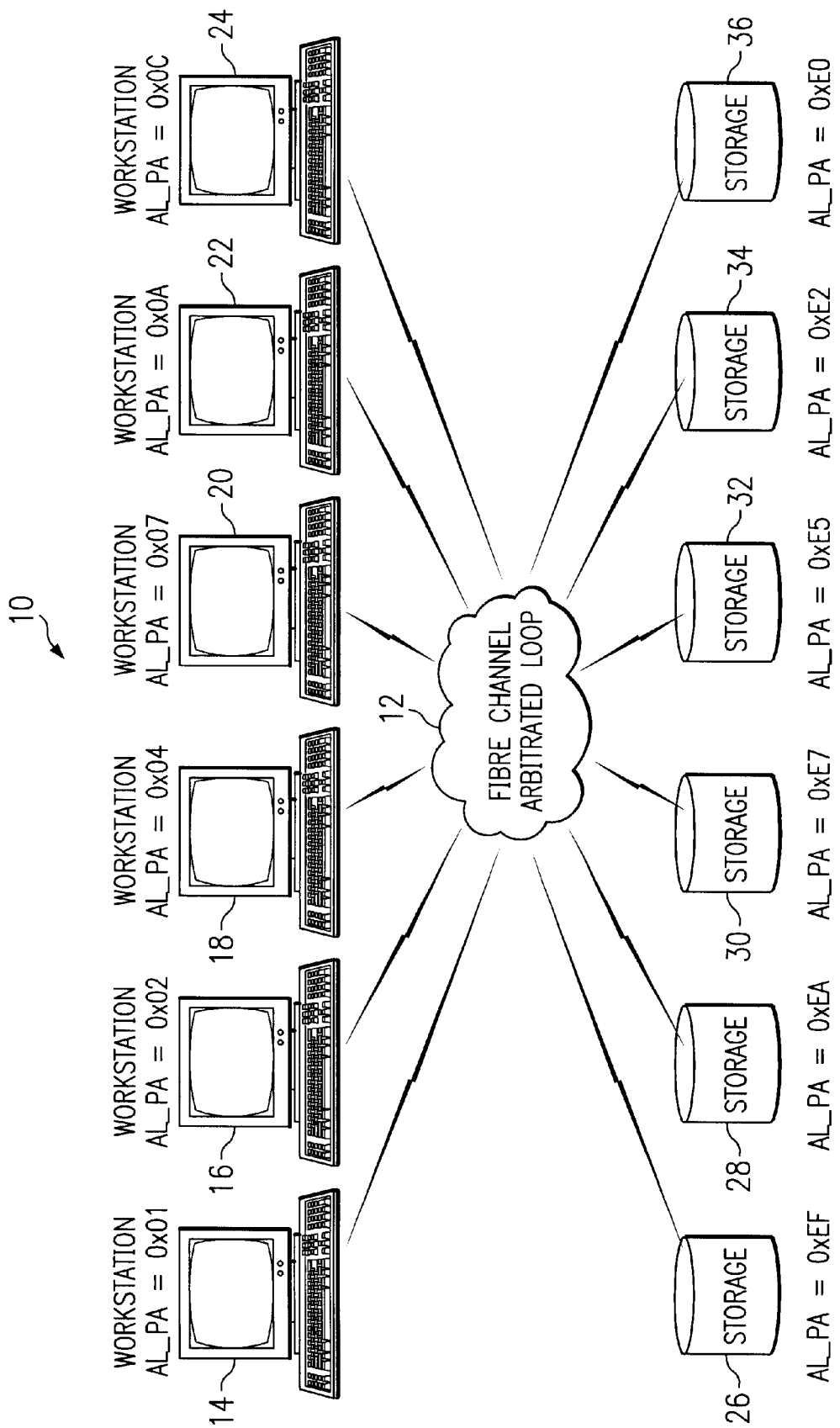
FIG. 1 shows a prior art fibre channel arbitrated loop network.

FIG. 1 illustrates a prior art fibre channel arbitrated loop network 10 that includes fibre channel arbitrated loop 12 which serves as a common access point. End stations 14 through 24 communicate via fibre channel arbitrated loop 12 with storage devices 26 through 36. All devices including end stations 14 through 24 and storage devices 26 through 36 share the bandwidth available on one arbitrated loop. The devices have access to the 100 megabytes per second data flow. During fibre channel arbitrated loop 12 initialization, each end station 14, for example, must acquire an address as described in the fibre channel arbitrated loop (revision 4.5) ANSI standard. During the address acquiring phase, a "select master" is chosen to facilitate and control the initialization process of sending LIPA, LIHA, and LISA frames.

There are 126 addresses that can be taken during the initialization according to a 128 bit map. The LIPA, LIHA, LISA frames are frames in fibre channel that contain 8 bytes, or 128 bytes. Each byte position represents an available or taken arbitrated loop physical address. A taken arbitrated loop physical address is one in which the byte position has a 1. Available arbitrated loop physical addresses are defined as those where the byte position is currently 0. When a network router port receives the initialization sequence, it finds the desired arbitrated loop physical address byte position and if available, sets the byte in the frame and acquires its arbitrated loop physical address. If not available, it selects the next available arbitrated loop physical address and sets that byte.

Current fibre channel arbitrated loop architectures support multiple devices on one fibre channel arbitrated loop. However, the bandwidth is shared amongst all the workstations and storage elements on the loop. The present invention segments the loop such that multiple conversations may occur simultaneously and bandwidth multiplication is possible. This process may be facilitated by a segmenting router to divide the available arbitrated loop physical addresses into a number of "sub-loops". The devices on the "sub-loops" operate as though they are one contiguous loop, although they are not.

The method of doing this is that each port on its own subloop, the segmenting router performs initialization on fibre channel arbitrated loop. The segmentation router, therefore, becomes the "select master" and wins the loop initialization select master (LISM) process. After winning, each port on its own segmenting router sends around the LIPA, LIHA, LISA frames. When sending the frames, the select master begins the LIPA frame with all but the range of address bits set to 1. Therefore, no other network loop port attached to another router port can acquire a duplicated address. Once each router port has completed the process, all addresses attached to the select master are unique and the router can route frames from one "sub-loop" to another.

Figures 2, 3:
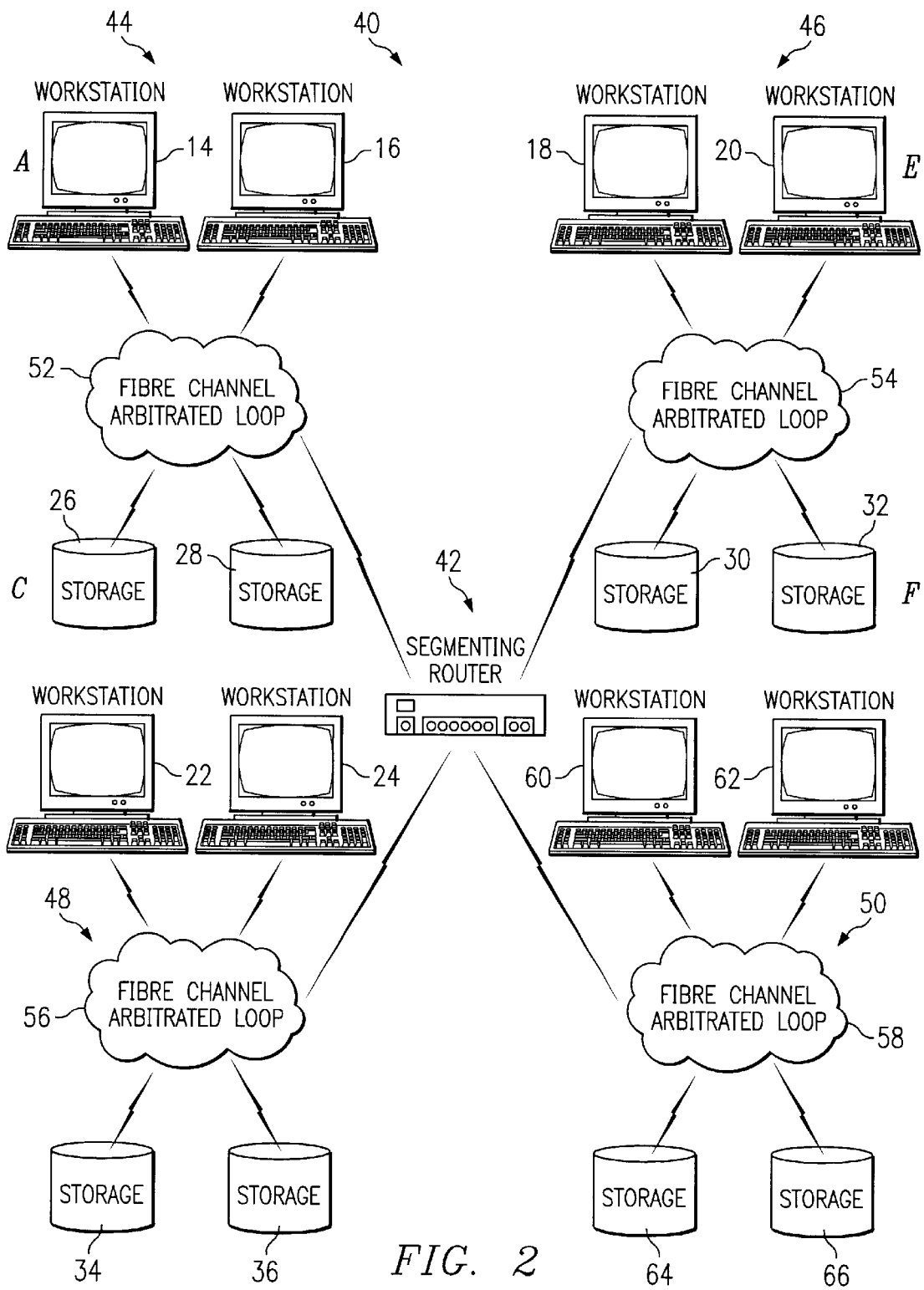
FIG. 2 illustrates one implementation of the fibre channel arbitrated loop system and method according to the teachings of the present invention.
FIG. 3 depicts the segmentation that the master router of the present invention uses to achieve the purposes of the present invention.

FIG. 2 illustrates how this might work in one embodiment of the invention as part of segmented fibre channel arbitrated loop 40. In segmented fibre channel loop 40, segmenting router 42 serves as a master router controlling communication among four segmented fibre channel arbitrated loops 44, 46, 48 and 50. Segmented fibre channel arbitrated loop with communication between work stations 14 and 16 via fibre channel arbitrated loop 52 to storage devices 26 and 28. Similar communications occur in the segmented fibre channel arbitrated loops via fibre channel arbitrated loop 54 for segmented network 46, fibre channel arbitrated loop 56 for segmented network 48, and via fibre channel arbitrated loop 58 for segmented network 50.

In FIG. 2, therefore, segmented end stations and storage devices form their own sub-arbitrated loop. The segmentation router allows conversations on the four separate loops to occur simultaneously and between each other without reducing the flowrate through the segmentation router. The result, in this example, is a multiple of four times improvement in fibre channel bandwidth. This may be scaled, for example, to up to 63 sub-segments or segmented loops in a loop having 126 addresses. However, in practice, it is probably the case that 4, 8, 16, or some similar grouping may be used for the segmented loops.

In the example of FIG. 2, workstations 14 and 16 have the ability to communicate with storage devices 26 and 28 independent of events or data flow requirements occurring at different subsegments. This permits devices within the same segmented loop to communicate immediately and essentially eliminate both the latency and unfairness associated with communications occurring elsewhere on fibre channel arbitrated loop 40.

The present invention also takes advantage of a phenomenon of communications known as "locality." The concept of locality means that most of the time, for example, 80% of the time, a given end station will access storage and servers that are close to that end station. Infrequently, for example 20% of the time or less, the same end station will access storage or servers that are far from the end station. By using locality as a principle of design, servers and storage systems may be organized so as to access each other frequently on the same segmented loop, i.e., with closer physical addresses, and then others far away, i.e., with remote physical addresses, may be accessed through the segmentation router.

Loop Initialization generally occurs according to the Fibre Channel Standards as promulgated by the American National Standards Institution's National Committee for Information Standards Technical Committee T11:I/O Interface document entitled "Fibre Channel Standards X.3230-1994-Fibre Channel Physical and Signalling Standard (FC-PH) and related publications. More particularly and with reference to these documents it becomes clear how the LISM frame establishes the segmentation router as the select master. As a result of operating the router as the select master, each port on the router becomes the select master port.

FIG. 3 illustrates two bit maps including 128 bit map 70 where each byte represents an arbitrated loop physical address. Bit map 72 also includes 128 bytes, which allows for 126 addresses. The 128 bytes, however, are segmented into segments zero through segment N. FIG. 3, therefore, shows a mapping of the bytes that are available in a loop.

In the present embodiment, the segmentation router wins the LISM process and sends out all ones in the address bit of all the remaining segments. Thus, only the available end addresses which have zeros in the addresses will be the ones forwarded or given segment. As an example, in a 4-segment router, segment zero was set to zero. Bytes zero through 31 would be set to zero so that the router would own that segment. Then all bytes 31–127 would be set to one. This would prevent any other device on that loop from gaining access to the addresses. Then segment one would set bytes 0–31 to one. Bytes 32–63 would be set to zero and bytes 63–121 would be set to one. This establishes the segment window for the arbitrated loops segmentation.

FIG. 3 shows that there may be up to n different segments. The router would come configured with the number of segments that is going to segment the loop into. The number n may be 4, 8, or 16, for example. At the end of this process there are unique identifiers across the entire loop of devices that are on the loop. Each of the devices in the given segment operate as though they were on a single and separate loop. However, the segmented devices may operate on their own segments and operate on other segments without knowing whether the master router is available. This permits operation of a segmented loop seamlessly and transparently.

Although the invention has been described in detail herein with reference to the illustrative embodiments, it is to be understood that this description is by way of example only and is not to be construed in a limiting sense. It is to be further understood, therefore, that numerous changes in the details of the embodiments of the invention and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A segmented fibre channel communications system, comprising:

a segmentation router comprising a plurality of ports;

a plurality of physical addresses associated with said segmentation router;

control instructions associated with said segmentation router for establishing said segmentation router as a master router by initializing each of at least a predetermined subset of said plurality of ports on a fibre channel arbitrated loop associated with said segmentation router, thereby causing said segmentation router to win the LISM process performed by said fibre channel arbitrated loop and causing the segmentation of said physical addresses.

2. The segmented fiber channel communications system of claim 1, wherein said control instructions further comprising instructions for transmitting LIPA, LIHA, and LISA frames to the fibre channel arbitrated loop from each of said at least a predetermined subset of said plurality of ports, said transmission beginning with LIPA frames having all but the LIPA frame range of address bits set to 1, thereby preventing other network loop ports attached to a router other than said master router from acquiring a duplicate address, thereby establishing a plurality of sub-loops each associated with a predetermined set of physical addresses.

3. The segmented fiber channel communications system of claim 1, wherein said plurality of physical addresses form a plurality of sub-loops comprising a plurality of segmented end stations.

4. The segmented fiber channel communications system of claim 1, wherein said plurality of physical addresses form a plurality of sub-loops comprising a plurality of segmented storage devices.

5. The segmented fiber channel communications system of claim 1, wherein said plurality of physical addresses form a plurality of sub-loops operable simultaneously to effectively raise the total data flow rate throughout said fibre channel arbitrated loop.

6. The segmented fiber channel communications system of claim 1, wherein said plurality of physical addresses form a plurality of sub-loops comprising a plurality of physical addresses associated for preferential locality of operations.

7. The segmented fiber channel communications system of claim 1, wherein said LIPA, LIHA, AND LISA frames are segmented according to a predetermined number of segmentation loops.

8. A method for segmenting a fibre channel arbitrated loop for providing simultaneously multiple conversations and multiplicative bandwidth, comprising the steps of:

dividing available arbitrated loop physical addresses on a plurality of sub-Loops using a segmentation router to generate a perceived contiguous loop by performing the steps of initializing a plurality of ports on the segmenting router on the fibre channel arbitrated loop so that the segmenting router becomes a select master router and wins the loop initiator slave-master arbitrated process;

sending LIPA, LIHA, LISA frames from the segmenting router; so that a segmentation router bytes except the range of address bits set to 1 to prevent other NL-ports attached to other routers from acquiring a duplicated address;

continuing this process until each router has completed the process thereby making all addresses attached to the router unique so that the router can route frames from one "sub-loop" to another.

9. The method for segmenting a fibre channel arbitrated loop of claim 8, further comprising the steps of transmitting LIPA, LIHA, and LISA frames to the fibre channel arbitrated loop from each of said at least a predetermined subset of said plurality of ports, said transmission beginning with LIPA frames having all but the LIPA frame range of address bits set to 1, thereby preventing other network loop ports attached to a router other than said master router from acquiring a duplicate address, thereby establishing a plurality of sub-loops each associated with a predetermined set of physical addresses.

10. The method for segmenting a fibre channel arbitrated loop of claim 8, further comprising the step of forming from said plurality of physical addresses a plurality of sub-loops comprising a plurality of segmented end stations.

11. The method for segmenting a fibre channel arbitrated loop of claim 8, further comprising the step of forming from said plurality of physical addresses a plurality of sub-loops comprising a plurality of segmented storage devices.

12. The method for segmenting a fibre channel arbitrated loop of claim 8, further comprising the step of forming said plurality of physical addresses as a plurality of sub-loops operable simultaneously to effectively raise the total data flow rate throughout said fibre channel arbitrated loop.

13. The method for segmenting a fibre channel arbitrated loop of claim 8, further comprising the step of forming said plurality of physical addresses as a plurality of sub-loops comprising a plurality of physical addresses associated for preferential locality of operations.

14. The method for segmenting a fibre channel arbitrated loop of claim 8, further comprising the step of segmenting said LIPA, LIHA, AND LISA frames according to a predetermined number of segmentation loops.

15. A method for forming a segmented fibre channel communications system, comprising the steps of:
    forming a segmentation router comprising a plurality of ports;
    forming a plurality of physical addresses associated with said segmentation router;
    forming control instructions associated with said segmentation router for establishing said segmentation router as a master router by initializing each of at least a predetermined subset of said plurality of ports on a fibre channel arbitrated Loop associated with said segmentation router, thereby causing said segmentation router to win the LISM process performed by said fibre channel arbitrated loop and causing the segmentation of said physical addresses.

16. The segmented fiber channel communications system forming method of claim 15, further comprising the step of forming said control instructions to further comprising instructions for transmitting LIPA, LIHA, and LISA frames to the fibre channel arbitrated loop from each of said at least a predetermined subset of said plurality of ports, said transmission beginning with LIPA frames having all but the LIPA frame range of address bits set to 1, thereby preventing other network loop ports attached to a router other than said master router from acquiring a duplicate address, thereby establishing a plurality of sub-loops each associated with a predetermined set of physical addresses.

17. The segmented fiber channel communications system forming method of claim 15, further comprising the step of forming said plurality of physical addresses to comprise a plurality of sub-loops comprising a plurality of segmented end stations.

18. The segmented fiber channel communications system forming method of claim 15, further comprising the step of forming said plurality of physical addresses to comprise a plurality of sub-loops comprising a plurality of segmented storage devices.

19. The segmented fiber channel communications system forming method of claim 15, further comprising the step of forming said plurality of physical addresses to comprise a plurality of sub-loops operable simultaneously to effectively raise the total data flow rate throughout said fibre channel arbitrated loop.

20. The segmented fiber channel communications system of claim 15, further comprising the step of forming said plurality of physical addresses to comprise a plurality of sub-loops comprising a plurality of physical addresses associated for preferential locality of operations.

* * * * *